United States Patent [19]

Fisher et al.

[11] 4,037,690
[45] July 26, 1977

[54] SENSOR MODULE BRACKET

[75] Inventors: Frank H. Fisher, Kenton, Ohio; Raymond John Jovick, Troy, Mich.

[73] Assignee: Rockwell International Corporation, Pittsburgh, Pa.

[21] Appl. No.: 621,216

[22] Filed: Oct. 9, 1975

[51] Int. Cl.² .................................................. B60T 8/12
[52] U.S. Cl. ................................ 188/181 R; 248/214; 310/168
[58] Field of Search ................ 228/175; 310/168, 169, 310/170, 75, 125; 301/1, 5 R, 6 R, 6 V, 6 E, 6 WB, 105 R; 188/181 A, 181 R; 248/221, 214, 230

[56] References Cited

U.S. PATENT DOCUMENTS

| | | | |
|---|---|---|---|
| 3,332,140 | 7/1967 | Sugira | 228/175 |
| 3,848,147 | 3/1976 | Anselmino | 310/168 |
| 3,911,302 | 10/1975 | De Claire | 310/168 |

Primary Examiner—Robert B. Reeves
Assistant Examiner—H. Grant Skaggs

[57] ABSTRACT

A bracket for mounting a wheel speed sensor module to a vehicle axle. The bracket is a stamped metal part including a central portion which is secured to the axle and end portions for mounting the sensor module. A tab formed integrally with the central portion of the bracket locates the bracket on the axle.

10 Claims, 3 Drawing Figures

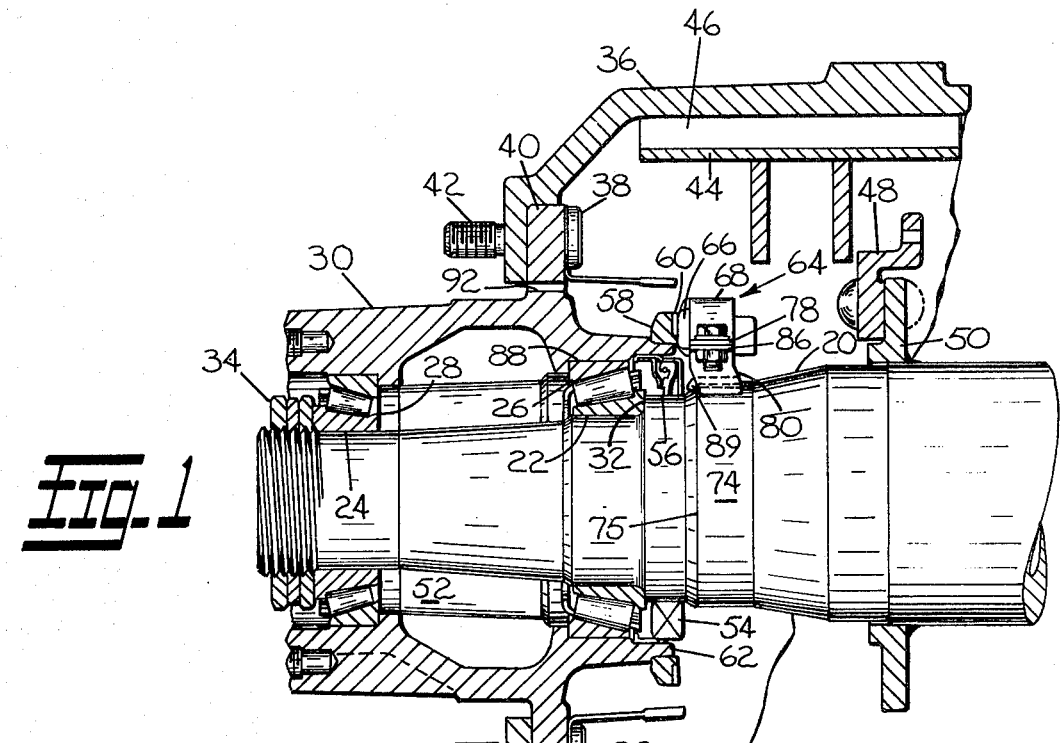
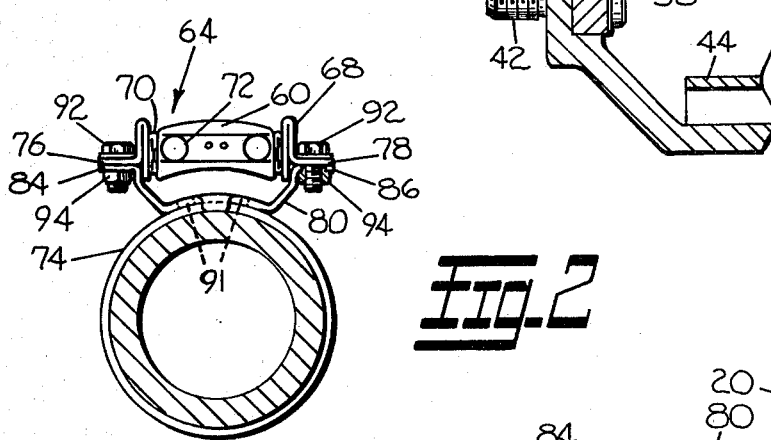

SENSOR MODULE BRACKET

BACKGROUND OF THE INVENTION

This invention is directed to a bracket for mounting a sensor module to the outer end of a vehicle axle. The invention is particularly useful in mountng a magnetic wheel speed sensor module to a trailer axle inboard of a wheel hub rotatably mounted at that end of the axle.

Most vehicle anti-skid brake control systems function in response to electrical signals indicative of the angular velocity of one or more of the vehicle wheels. Generally these signals are derived from an electromagnetic sensor including a magnet carried by a stationary portion of the vehicle such as the axle housng, and a toothed or notched ring rotatable with the wheel opposite the magnet. As the teeth or notches of the ring pass the magnetic sensor unit the resulting variations in flux generate a signal, the frequency of which is a function of the angular velocity of the wheel.

To produce the required accuracy of the velocity signal the sensor unit and ring must be precisely located with respect to each other and must remain in a preselected relationship even after extended operation in which the components are subjected to road shocks and constant vibration. It is also essential that installation of the components be compatible with mass production techniques. The mounting of the sensor units must also be such that upon reinstallation of a wheel after removal for repair, the parts will automatically be restored to their original operating position.

Wheel speed sensor modules including means permitting automatic adjustment of the magnetic sensor units relative to a rotor are disclosed in U.S. Pat. No. 3,772,548 which issued to R. C. Wroblewski et al, on Nov. 13, 1973 and patent application Ser. No. 527,609, filed on Nov. 27, 1974, now Pat. No. 3,911,302. Those modules comprise magnetic sensor units which are movable relative to a supporting frame or housing.

The present invention provides a simple, economical and effective means for mounting a magnetic wheel speed sensor module to the axle of a vehicle.

SUMMARY OF THE INVENTION

A bracket for mounting a wheel speed sensor module to a vehicle axle comprising an elongated body with means for mounting the spaced ends of a wheel speed sensor module at each end of the body. The center portion of the elongated body includes a mounting surface adapted for contact with a surface of the axle and locating means projecting outward. Intermediate portions of the elongated body connect each of the end portions to the center portion and space the end portions away from the center portion of the body. In a preferred embodiment, the locating means is a tab provided at one side of the mounting surface. The tab abuts a shoulder provided to the axle end to locate the bracket relative to the edge of a cylindrical surface where the center portion of the bracket is secured by welding.

The present invention and the advantages offered thereby will become apparent from the following description of an embodiment of the invention and the accompanying drawings.

BRIEF DESCRIPTION OF THE DRAWINGS

In the drawings, wherein like reference numerals designate like parts throughout:

FIG. 1 is a fragmentary view partly in section, showing the outer end of an axle and a wheel speed sensor module mounted in accordance with the present invention;

FIG. 2 is an end view, partly in section, showing the sensor module, bracket and axle of FIG. 1; and FIG. 3 is a perspective view showing the sensor mounting bracket and part of the axle outer end of FIG. 1.

Description of a Preferred Embodiment

For present purposes the invention will be disclosed as applied to a non-steerable vehicle axle, such as a trailer axle designed for heavy duty use. As used herein the term "axle" is intended to refer to any component on which a wheel hub may be rotatably mounted and includes components sometimes called spindles or axle housings. In a similar manner "sensor module" is intended to mean the magnetic sensor unit and the housing or frame it may be supported in as well as a magnetic sensor unit alone when it is not carried by a separate housing or frame.

With reference to the drawings, there is shown the outer end of a hollow tubular axle 20. The outer end of the axle 20 is provided with a pair of bearing seats 22 and 24 for inner and outer bearing assemblies 26 and 28 upon which the wheel hub 30 is supported. Upon installation of the wheel hub the inner bearing 26 is moved into position against an accurately located radial shoulder 32 on the axle 20 and the parts are locked in this position by a lock nut assembly 34 threaded to the axle 20 and bearing against the inner race of the outer bearing assembly 28 to impart a predetermined preload to the two bearing assemblies 26 and 28.

The brake drum 36 is secured by a plurality of bolts 38 to a radially extending flange 40 on the wheel hub 30, the flange also carrying a plurality of wheel mounting studs 42 circumferentially spaced from the bolts 38. The brake assembly, which is conventional, includes brake shoes 44 carrying linings 46 and a brake operating mechanism, not shown, carried by a spider or backing plate, a portion of which is shown at 48 mounted on a radial flange 50 welded to the axle 20. The spider 48 and flange 50 tus provide means for mounting a brake mechanism to the axle 20.

Lubricant for the bearing assemblies 26 and 28 is carried in a cavity 52, the outer end of which is sealed by means not shown. The inner end of the cavity 52 is sealed by a seal member 54 seated on a cylindrical surface 56 of the axle 20.

The wheel speed sensor assembly at the outer end of the axle 20 is comprised of a steel ring or rotor 58 carried by the wheel hub 30 and a sensor module 64. The ring 58 has a plurality of circumferentially and equally spaced notches or teeth 60 on its inboard surface. The ring 58 is mounted for rotation with the wheel hub 30 and may be press fitted onto an annular mounting surface 62.

The magnetic sensor module 64 is comprised of a magnetic sensor unit 66 carried by a frame or housing 68. The sensor unit 66 is preferably supported in the frame 68 by a retainer 70 and resilient means 72 permitting axial movement of the unit 66 relative to the frame 68.

The sensor module 64 is mounted to the axle 20 by a stamped metal bracket 80. The bracket 80 is an elongated metal body having a center portion 82 and end portions 84, 86 adapted to mount the spaced ends 76, 78 of sensor module 64. A pair of radially extending intermediate portions 83 and 85 of the bracket space the end portions 82, 84 radially outward from the center portion 82 and axle 20. The center portion 82 is cylindrically curved to permit substantial surface-to-surface contact between the bottom or mounting surface of the center portion 82 and a cylindrical surface 74 of the axle. The end 89 of a locating tab 88 provided at one side of the center portion 82 is bent to project radially inwardly from the curved mounting surface of bracket 80. When the bracket 80 is being mounted to the axle, the end 89 of tab 88 is moved into abutment with a shoulder 75 extending radially inward at one end of the cylindrical surface 74 to axially locate the bracket relative to the edge of surface 74. The bracket is then secured to the axle by weld metal deposited through a pair of apertures or weld ports 91 provided through the center portion 82. The weld ports 91 thus provide means for securing the center portion 82 of the bracket to the axle.

The spaced ends 76, 78 of sensor module 64 are secured to the end portions 84, 86 of bracket 80 by a pair of bolts 92. The bolts extend through apertures provided to the spaced ends 76, 78 of sensor module frame 68 and the end portions 84, 86 of bracket 80. Each of the bolts 92 is threaded into and secured by nuts 94 welded to the undersurface of each portion of the bracket 80.

The bracket 80 thus provides a simple, economical and effective means for mounting a sensor module to the outer end of a vehicle axle. The radially extending intermediate portions of the bracket space the module mounting ends radially outward from the axle and axially off-set the module mounting ends relative to the center portion of the bracket. This configuration locates the sensor module with the magnetic sensor unit in close proximity with and responsive to the toothed, axially inboard surface of the rotor.

The sensor module mounting bracket may also be embodied in in other specific forms without departing from the spirit or essential characteristics of the invention. The foregoing description is therefore to be considered as illustrative and not restrictive, the scope of the invention being defined by the appended claims and all changes which come within the meaning and range of equivalency of the claims are therefore intended to be embraced thereby.

We claim:

1. A bracket for mounting a sensor module to a veicle axle comprising an elongated body, a center portion of said body having a mounting surface adapted for contact with a surface of said axle and locating means projecting away from said surface, each end of said body being spaced radially outward from said center portion and adapted to mount one end of a sensor module, intermediate portions of said body connecting each of said body ends to said center portion and means for securing said center portion to said axle.

2. The bracket defined by claim 1 wherein said locating means comprises a tab formed at one side of said center portion.

3. The bracket defined by claim 1 wherein said mounting surface is a cylindrically curved surface, said locating means is a tab provided at one side of said mounting surface and projecting radially inward relative to said mounting surface.

4. The bracket defined by claim 3 wherein each end of said body is radially spaced from said center portion and axially off-set from said center portion in the direction of said tab.

5. The bracket defined by claim 1 wherein said means for securing said center portion to said axle comprises at least one weld port extending from said mounting surface to the opposite surface of said center portion.

6. A bracket for mounting a sensor module to a vehicle axle comprising a stamped elongate plate having a center portion including a cylindrically curved axle mounting surface, each end of said plate being spaced radially outward from said center portion and adapted to mount one end of a sensor module, intermediate portions of said plate connecting each of said ends to said center portion, a locating tab formed integrally with and at one side of said center portion, a part of said tab extending radially inward relative to said mounting surface, and at least one weld port extending from said mounting surface through said bracket to the opposite surface of said center portion.

7. In a vehicle axle end includng a rotatably mounted wheel hub and a brake mechanism, the improvement comprising a sensor mounting bracket having a center portion seated on a cylindrical surface of said axle, a shoulder extending radially inwardly at one end of said cylindrical surface, a tab extending radially inward from said bracket, said tab abutting said shoulder and thereby locating said bracket relative to said end of said cylindrical surface, and means securing said bracket to said axle.

8. The axle end defined by claim 7 wherein said bracket includes two end portions spaced radially outward from said axle and adapted for mounting the spaced ends of a sensor module and intermediate portions connecting each of said end portions to said center portion.

9. The axle end defined by claim 8 wherein said end portions are axially off-set from said center portion in the direction of said shoulder by said intermediate portions of said bracket.

10. The axle end defined by claim 7 wherein said means for rotatably mounting a wheel hub comprises axially spaced inner and outer bearing seats, said cylindrical surface is spaced axially inward from said inner bearing seat, and said bracket is secured to said cylindrical surface by at least one weld effected through a port provided to the center portion of said bracket.

* * * * *